US008917769B2

(12) United States Patent
Xu et al.

(10) Patent No.: US 8,917,769 B2
(45) Date of Patent: *Dec. 23, 2014

(54) METHODS AND SYSTEMS TO ESTIMATE MOTION BASED ON RECONSTRUCTED REFERENCE FRAMES AT A VIDEO DECODER

(75) Inventors: Lidong Xu, Beijing (CN); Yi-Jen Chiu, San Jose, CA (US); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/566,823

(22) Filed: Sep. 25, 2009

(65) Prior Publication Data

US 2011/0002389 A1   Jan. 6, 2011

Related U.S. Application Data

(60) Provisional application No. 61/222,982, filed on Jul. 3, 2009.

(51) Int. Cl.
*H04N 7/12* (2006.01)
*H04N 19/51* (2014.01)
*H04N 19/61* (2014.01)
*H04N 19/44* (2014.01)
*H04N 19/57* (2014.01)

(52) U.S. Cl.
CPC ... *H04N 19/00781* (2013.01); *H04N 19/00715* (2013.01); *H04N 19/00533* (2013.01); *H04N 19/00678* (2013.01)
USPC .................................................. 375/240.16

(58) Field of Classification Search
None
See application file for complete search history.

(56) References Cited

U.S. PATENT DOCUMENTS 6,014,473 A   1/2000   Hossack et al.
6,058,142 A   5/2000   Ishikawa et al.
(Continued)

FOREIGN PATENT DOCUMENTS

CN   1450809 A   10/2003
CN   1961582 A   5/2007
(Continued)

OTHER PUBLICATIONS

Laroche, et al., "RD optimized coding for motion vector predictor seletion," IEEE Transacions on circuts and systems for video technology, vol. 18, No. 12, Dec. 2008, pp. 1681-1691.
Combined Search and Examination Report received for United Kingdom Patent Application No. 1100658.2, mailed on May 16, 2011, 6 pages.
Kamp et al., "Decoder Side Motion Vector Derivation for Inter Frame Video Coding", 15th IEEE International Conference on Image Processing, (ICIP 2008), Oct. 12-15, 2008, pp. 1120-1123.
(Continued)

*Primary Examiner* — Michael J Moore, Jr.
(74) *Attorney, Agent, or Firm* — Garret IP, LLC

(57) ABSTRACT

Methods and systems to apply motion estimation (ME) based on reconstructed reference pictures in a B frame or in a P frame at a video decoder. For a P frame, projective ME may be performed to obtain a motion vector (MV) for a current input block. In a B frame, both projective ME and mirror ME may be performed to obtain an MV for the current input block. The ME process can be performed on sub-partitions of the input block, which may reduce the prediction error without increasing the amount of MV information in the bitstream. Decoder-side ME can be applied for the prediction of existing inter frame coding modes, and traditional ME or the decoder-side ME can be adaptively selected to predict a coding mode based on a rate distribution optimization (RDO) criterion.

14 Claims, 8 Drawing Sheets

(56) References Cited

U.S. PATENT DOCUMENTS

| | | | |
|---|---|---|---|
| 6,519,005 B2* | 2/2003 | Bakhmutsky et al. | 348/415.1 |
| 6,707,367 B2 | 3/2004 | Castaneda et al. | |
| 7,010,279 B2 | 3/2006 | Rofougaran | |
| 7,023,921 B2* | 4/2006 | Subramaniyan et al. | 375/240.16 |
| 7,133,451 B2 | 11/2006 | Kim et al. | |
| 7,248,844 B2 | 7/2007 | Rofougaran | |
| 7,259,649 B2 | 8/2007 | Ancey et al. | |
| 7,260,148 B2* | 8/2007 | Sohm | 375/240.16 |
| 7,289,672 B2* | 10/2007 | Sun et al. | 382/236 |
| 7,463,687 B2* | 12/2008 | Subramaniyan et al. | 375/240.16 |
| 7,526,256 B2 | 4/2009 | Bhatti et al. | |
| 7,590,180 B2* | 9/2009 | Kang | 375/240.16 |
| 7,683,851 B2 | 3/2010 | Rofougaran et al. | |
| 7,751,482 B1* | 7/2010 | Srinivasan et al. | 375/240.16 |
| 7,764,740 B2* | 7/2010 | Seok et al. | 375/240.16 |
| 7,880,547 B2 | 2/2011 | Lee et al. | |
| 7,890,066 B2 | 2/2011 | Rofougaran | |
| 7,924,135 B2 | 4/2011 | Chen et al. | |
| 7,940,152 B1 | 5/2011 | Kim et al. | |
| 8,107,748 B2 | 1/2012 | Miao et al. | |
| 8,233,538 B2* | 7/2012 | Sun et al. | 375/240.12 |
| 8,238,421 B2* | 8/2012 | Choi et al. | 375/240.02 |
| 8,279,018 B1 | 10/2012 | Song et al. | |
| 8,279,927 B2* | 10/2012 | Sun et al. | 375/240.12 |
| 8,295,551 B2 | 10/2012 | Lertrattanapanich et al. | |
| 8,331,450 B2* | 12/2012 | Sun et al. | 375/240.15 |
| 8,494,054 B2* | 7/2013 | Nair et al. | 375/240.16 |
| 8,519,814 B2 | 8/2013 | Feng et al. | |
| 2002/0176500 A1* | 11/2002 | Bakhmutsky et al. | 375/240.13 |
| 2003/0031128 A1 | 2/2003 | Kim et al. | |
| 2003/0063671 A1 | 4/2003 | Song | |
| 2003/0189981 A1 | 10/2003 | Lee | |
| 2004/0046891 A1 | 3/2004 | Mishima et al. | |
| 2004/0114688 A1* | 6/2004 | Kang | 375/240.12 |
| 2005/0018772 A1 | 1/2005 | Sung et al. | |
| 2005/0135481 A1 | 6/2005 | Sung et al. | |
| 2005/0220190 A1 | 10/2005 | Ha et al. | |
| 2005/0259736 A1 | 11/2005 | Payson | |
| 2005/0286777 A1 | 12/2005 | Kumar et al. | |
| 2006/0018383 A1 | 1/2006 | Shi et al. | |
| 2006/0109905 A1* | 5/2006 | Seok et al. | 375/240.16 |
| 2006/0215761 A1 | 9/2006 | Shi et al. | |
| 2007/0053440 A1 | 3/2007 | Hsieh et al. | |
| 2007/0064803 A1 | 3/2007 | Miao et al. | |
| 2007/0064804 A1* | 3/2007 | Paniconi et al. | 375/240.16 |
| 2007/0086526 A1 | 4/2007 | Koto et al. | |
| 2007/0239546 A1 | 10/2007 | Blum et al. | |
| 2007/0268964 A1 | 11/2007 | Zhao | |
| 2007/0297510 A1 | 12/2007 | Herpel et al. | |
| 2008/0069230 A1 | 3/2008 | Kondo et al. | |
| 2008/0101707 A1 | 5/2008 | Mukherjee et al. | |
| 2008/0175320 A1* | 7/2008 | Sun et al. | 375/240.12 |
| 2008/0181309 A1 | 7/2008 | Lee et al. | |
| 2008/0214146 A1 | 9/2008 | Lincoln et al. | |
| 2008/0253149 A1 | 10/2008 | Matumoto | |
| 2008/0253457 A1* | 10/2008 | Moore | 375/240.16 |
| 2008/0281685 A1 | 11/2008 | Jaffe et al. | |
| 2009/0060359 A1 | 3/2009 | Kim et al. | |
| 2009/0067505 A1* | 3/2009 | Tourapis et al. | 375/240.16 |
| 2009/0161763 A1 | 6/2009 | Rossignol et al. | |
| 2009/0172751 A1 | 7/2009 | Aldrey et al. | |
| 2009/0207915 A1 | 8/2009 | Yan et al. | |
| 2009/0304084 A1 | 12/2009 | Hallapuro et al. | |
| 2010/0046614 A1* | 2/2010 | Choi et al. | 375/240.02 |
| 2010/0109798 A1 | 5/2010 | Chu | |
| 2010/0166072 A1* | 7/2010 | Bukin | 375/240.16 |
| 2010/0201457 A1 | 8/2010 | Lee et al. | |
| 2010/0296580 A1* | 11/2010 | Metoevi et al. | 375/240.16 |
| 2011/0002387 A1 | 1/2011 | Chiu et al. | |
| 2011/0002390 A1 | 1/2011 | Chiu et al. | |
| 2011/0043316 A1 | 2/2011 | Yang et al. | |
| 2011/0090964 A1 | 4/2011 | Lidong et al. | |
| 2011/0261882 A1 | 10/2011 | Zheng et al. | |
| 2011/0286523 A1* | 11/2011 | Dencher | 375/240.14 |
| 2012/0294370 A1 | 11/2012 | Chiu et al. | |
| 2013/0064296 A1* | 3/2013 | Sun et al. | 375/240.12 |
| 2013/0082810 A1 | 4/2013 | Feng et al. | |
| 2013/0287111 A1 | 10/2013 | Xu et al. | |

FOREIGN PATENT DOCUMENTS

| | | |
|---|---|---|
| CN | 1977539 A | 6/2007 |
| CN | 101001377 A | 7/2007 |
| CN | 101023673 A | 8/2007 |
| CN | 101023676 A | 8/2007 |
| CN | 101378504 A | 3/2009 |
| CN | 101621696 A | 6/2009 |
| CN | 101647285 A | 2/2010 |
| CN | 101945276 A | 1/2011 |
| CN | 102045563 A | 5/2011 |
| CN | 102340664 A | 2/2012 |
| DE | 10 2010 025 816 A1 | 1/2011 |
| DE | 10 2010 046 508 A1 | 6/2011 |
| DE | 10 2011 008 630 A1 | 9/2011 |
| EP | 1903798 A2 | 3/2008 |
| EP | 1932366 A2 | 6/2008 |
| EP | 1981281 A2 | 10/2008 |
| GB | 2471577 A | 1/2011 |
| GB | 2477033 B | 4/2012 |
| JP | 10-023420 A | 1/1998 |
| JP | 10-336666 A | 12/1998 |
| JP | 11-205799 A | 7/1999 |
| JP | 2000-350211 A | 12/2000 |
| JP | 2003-169338 A | 6/2003 |
| JP | 2003-319400 A | 11/2003 |
| JP | 2004-048512 A | 2/2004 |
| JP | 2004-328633 A | 11/2004 |
| JP | 2004-343349 A | 12/2004 |
| JP | 2005-094458 A | 4/2005 |
| JP | 2005-269164 A | 9/2005 |
| JP | 2006-033433 A | 2/2006 |
| JP | 2009-044350 A | 2/2009 |
| JP | 2011-029863 A | 2/2011 |
| KR | 20090069461 A | 7/2009 |
| KR | 10-2011-0003438 A | 1/2011 |
| TW | 201127068 A | 8/2011 |
| TW | 201204054 A | 1/2012 |
| WO | 2006000504 A1 | 1/2006 |
| WO | 2007/035276 A2 | 3/2007 |
| WO | 2009110754 A2 | 9/2009 |
| WO | 2009/110754 A3 | 10/2009 |
| WO | 2010/086041 A1 | 8/2010 |
| WO | 2012125178 A1 | 6/2011 |
| WO | 2012/045225 A1 | 4/2012 |
| WO | 2012083487 A1 | 6/2012 |

OTHER PUBLICATIONS

Klomp et al., "Decoder-Side Block Motion Estimation for H.264/MPEG-4 AVC Based Video Coding", IEEE International Symposium on Circuits and Systems, (ISCAS 2009), May 24-27, 2009, pp. 1641-1644.

Kamp et al., "Fast Decoder Side Motion Vector Derivation for Inter Frame Video Coding", Picture Coding Symposium, (PCS 2009), May 6-8, 2009, pp. 1-4.

Combined Search and Examination Report received for United Kingdom Patent Application No. 1015985.3, mailed on Jan. 17, 2011, 5 pages.

Combined Search and Examination Report received for United Kingdom Patent Application No. 1011216.7, mailed on Oct. 14, 2010, 6 pages.

Chen et al., "A Macroblock Level Adaptive Search Range Algorithm for Variable Block Size Motion Estimation in H.264/AVC," International Symposium on Intelligent Signal Processing and Communication Systems, ISPACS, Xiamen, China, Nov. 28-Dec. 1, 2007, pp. 598-601.

Hsia et al., "High Efficiency and Low Complexity Motion Estimation Algorithm for MPEG-4 AVC/H.264 Coding," Tamkang Journal of Science and Engineering, 2007, vol. 10, No. 3, pp. 221-234.

Nisar et al., "Fast Motion Estimation Algorithm Based on Spatio-Temporal Correlation and Direction of motion Vectors," Electronics Letters, Dept. of Mechatronics, Gwangju Inst. of Sci. & Technol., Nov. 23, 2006, vol. 42, No. 24, pp. 2.

(56) References Cited

OTHER PUBLICATIONS

Werda et al., "Optimal DSP-Based Motion Estimation Tools Implementation for H.264/AVC Baseline Encoder," IJCSNS International Journal of Computer Science and Network Security, May 2007, vol. 7, No. 5, pp. 141-150.
Office Action received for German Patent Application No. 102010046508.9, mailed on Jul. 26, 2011, 14 pages of German Office Action including 7 pages of English Translation.
International Search Report and Written Opinion received for Patent Application No. PCT/CN2011/000568, mailed on Jan. 19, 2012, 9 pages.
Office Action received for Korean Patent Application No. 20100064539, mailed on Feb. 10, 2012, 1 page of English Translation only.
Office Action Received for Chinese Patent application No. 201010270056.0, mailed on May 3, 2012, 5 pages of Office Action and 5 pages of English Translation.
Office Action received for Chinese Patent Application No. 201010270056.0, mailed on May 27, 2013, 9 pages of Office action including 5 pages of English Translation.
Office Action received for Korean Patent Application No. 10-2011-4254, mailed on Jun. 19, 2013, 11 pages of office action including 6 pages of English Translation.
Office Action received for China Patent Application No. 201010507057.2, mailed on Apr. 12, 2013, 12 Pages including 7 pages of English Translation.
Notice of Allowance Received for Korean Patent Application No. 10-2010-0064539, mailed on Sep. 27, 2012, 3 pages of Notice of Allowance including 1 page of English Translation.
Notice of Allowance Received for Korean Patent application No. 10-2010-0102216, mailed on Nov. 26, 2012, 3 pages of Notice of Allowance including 1 page of English Translation.
Office Action Received from Chinese Patent Application No. 201010270056.0, mailed on Dec. 13, 2012, 12 pages of Office Action including 5 pages of English Translation.
Notice of Allowance Received for Japanese Patent Application No. 2010-211120, mailed on Jan. 24, 2012, 1 Page only.
International Preliminary Report on Patentability received for PCT Application No. PCT/CN2011/000568, mailed on Apr. 9, 2013, 4 pages.
Korean Office Action Received for Korean Patent Application No. 2010-0102216, mailed on May 22, 2012, 2 pages English Translation only.
Chinese Office Action Received for Chinese Patent application No. 201010507057.2, mailed on Aug. 3, 2012, 3 pages of Office Action and 3 pages of English Translation.
Korean Office Action Received for Korean Patent Application No. 10-2010-4254, mailed on Jun. 12, 2012, 3 pages of Office Action and 3 pages of English Translation.
Japanese Office Action Received for Japanese Patent Application No. 2011-004871, mailed on Aug. 14, 2012, 2 page of Office Action and 2 page of English Translation.
International Search Report and Written Opinion received for Patent Application No. PCT/CN2010/002107, mailed on Oct. 13, 2011, 12 pages.
German Office Action Received for Germany Patent application No. 10 2010 046 508.9, mailed on Sep. 5, 2012, 13 pages of Office Action including 5 pages of English Translation.
Japanese Office Action Received for Japanese Patent Application No. 2011-004871 mailed on Nov. 20, 2012, 4 pages of Office action including 2 pages of English Translation.
Murakami, et al., "Advanced B Skip Mode with Decoder-side Motion Estimation", 37th VCEG meeting @ Yokohama, VCEG-AK12, Hitachi Inspire the Next, Central Research Laboratory, Embedded System Platform Research Laboratory., (Apr. 15-18, 2009), 8 pages.
Korean Office Action Received for Korean Patent Application 10-2011-0004254, mailed on Dec. 26, 2012. 5 Pages of Office Action Including 2 Pages of English Translation.
International Search Report and Written Opinion received for PCT Patent Application No. PCT/US2012/056682, mailed on Mar. 4, 2013, 9 Pages.
Guo et al. "Distributed Video Coding with Spatial Correlation Exploited Only at the Decoder" IEEE. School of Computer Science and Technology, Harbin Institute of Technology, Harbin, 150001, China, Microsoft Research Asia, Beijing, 100080, China. 2007, pp. 41-44.
Office Action received for Japanese Patent Application No. 100101277, mailed on Aug. 7, 2013, 18 pages of Office Action Including 9 pages of English Translation.
International Search Report and Written opinion for PCT Patent Application No. PCT/US2011/042292 (P37592PCT), mailed on Mar. 23, 2012. 10 pages.
Office Action received for Chinese Patent Application No. 201110056040.4, mailed on Sep. 2, 2013; 11 Pages of office action including 6 pages of English Translation.
Office Action received for Taiwanese Patent Application No. 100101277, mailed on Feb. 14, 2014, 7 pages of English Translation and 4 pages of Office Action.
Office Action Received for Korea Patent Application No. 10-2011-0004254, mailed on Dec. 17, 2013, 2 pages of English Translation and 3 pages of Office Action.
Office Action received for Korean Patent Application No. 10-2013-7002525, mailed on Jan. 24, 2014, 3 pages of English Translation and 4 pages of Office Action.
Notice of Allowance received for United Kingdom Patent Application No. 1100658.2, mailed on Mar. 20, 2012, 2 pages.
Notice of Grant received for Chinese Patent Application No. 201010507057.2, mailed on Mar. 6, 2014, 2 pages of English Translation and 2 pages of Notice of Grant.
Office Action received for Chinese Patent Application No. 201010507057.2 , mailed on Oct. 28, 2013, 4 pages of English Translation and 3 pages of Office Action.
Notice of Allowance received for Japanese Patent Application No. 2011-004871, mailed on Mar. 12, 2013, 3 pages of Notice of Allowance only.
Office Action received for Chinese Patent Application No. 201110056040.4, mailed on Mar. 31, 2014, 4 pages of English Translation and 3 pages of Office Action.
Notice of Allowance received for Japanese Patent Application No. 2013-532027, mailed on Jun. 10, 2014, 3 pages of Notice of Allowance only.
Office Action received for Japanese Patent Application No. 2013-532027, mailed on Jan. 21, 2014, 2 pages of English Translation and 2 pages of Office Action.
Office Action received for Japanese Patent Application No. 2013-540202, mailed on Feb. 4, 2014, 1 page of English Translation and 1 page of Office Action.
Kamp et al., "Decoder Side Motion Vector Derivation for Inter Frame Video Coding", Oct. 15, 2008, 4 pages.
Office Action received for Japanese Patent Application No. 2013-540202, mailed on May 20, 2014, 1 page of English Translation and 1 page of Office Action.
International Preliminary Report on Patentability and Written Opinion received for PCT Patent Application No. PCT/CN2010/002107, mailed on Jul. 4, 2013, 12 pages.
International Preliminary Report on Patentability and Written Opinion received for PCT Patent Application No. PCT/US2011/042292, mailed on Sep. 26, 2013, 12 pages.
International Preliminary Report on Patentability and Written Opinion received for PCT Patent Application No. PCT/US2012/056682, mailed on Apr. 10, 2014, 6 pages.
Office Action received for Taiwanese Patent Application No. 100136070, mailed on Jul. 24, 2014, 6 pages of Office Action and 4 pages of English Translation.
Extended European Search Report received for EP Patent Application No. 11860936.1, mailed on Aug. 29, 2014, 10 pages.
Notice of Allowance received for Chinese Patent Application No. 201110056040.4, mailed on Aug. 6, 2014, 2 pages of Notice of Allowance and 2 pages of English Translation.
Notice of Allowance Received for U.S. Appl. No. 13/895,939 mailed on Sep. 12, 2014.

* cited by examiner

METHODS AND SYSTEMS TO ESTIMATE MOTION BASED ON RECONSTRUCTED REFERENCE FRAMES AT A VIDEO DECODER

This application claims the benefit of U.S. Provisional No. 61/222,982, filed on Jul. 3, 2009.

BACKGROUND

Motion estimation (ME) in video coding may be used to improve video compression performance by removing or reducing temporal redundancy among video frames. For encoding an input block, traditional motion estimation may be performed at an encoder within a specified search window in reference frames. This may allow determination of a motion vector to minimize the sum of absolute differences (SAD) between the input block and a reference block. The motion vector (MV) information can then be transmitted to a decoder for motion compensation. The motion vector can be determined for fractional pixel units, and interpolation filters can be used to calculate fractional pixel values.

The motion estimation can be forward, backward or bi-directional, where backward and bi-directional ME may be used in the coding of bi-predictive frames (referred to herein as B frames) while forward ME can be used for both B frames and predicted frames (referred to herein as P-frames). FIG. 1 shows an example of ME for a B frame 110, where MV0 is a forward motion vector obtained by a forward motion search within a search window 160 in a forward reference frame 120. MV1 may be a backward motion vector obtained by a backward motion search within a search window 170 in a backward reference frame 130. In forward ME, the reference block 150 pointed to by MV0 is used as the prediction associated with a current block 140. In backward ME, the reference block 180 pointed to by MV1 may be used as the prediction, in the backwards direction, of the current block 140. In bi-directional ME, the average of the two reference blocks pointed to by MV0 and MV1 may be used as the prediction of the current block 140. Considering that a current block such as block 140 has motion similar to its temporal and spatial neighboring blocks, MV prediction can be performed using the MVs of neighboring blocks to get a predicted MV for a current block. The predicted MV can be used as the search center, and in an entropy coding process, only the difference between the searched MV and the predicted MV is encoded to reduce MV redundancy.

BRIEF DESCRIPTION OF THE DRAWINGS/FIGURES

DETAILED DESCRIPTION

A digital video clip includes consecutive video frames. The motions of an object or background in consecutive frames may form a smooth trajectory, and motions in consecutive frames may have relatively strong temporal correlations. By utilizing this correlation, a motion vector can be derived for a current encoding block by estimating motion from reconstructed reference pictures. Determination of a motion vector at a decoder may reduce transmission bandwidth relative to motion estimation performed at an encoder.

Where original input frames are not available at the decoder, ME at the decoder can be performed using the reconstructed reference frames. When encoding a P frame, there may be multiple reference frames in a forward reference buffer. When encoding a B frame, there may be multiple reference frames in the forward reference buffer and at least one reference frame in a backward reference buffer.

The following discusses performing ME at a decoder, to obtain an MV for a current block, according to an embodiment. For B frame encoding, mirror ME or projective ME may be performed to get the MV. For P frame encoding, projective ME may be performed to get the MV.

Mirror ME at the Decoder

Figure 1:
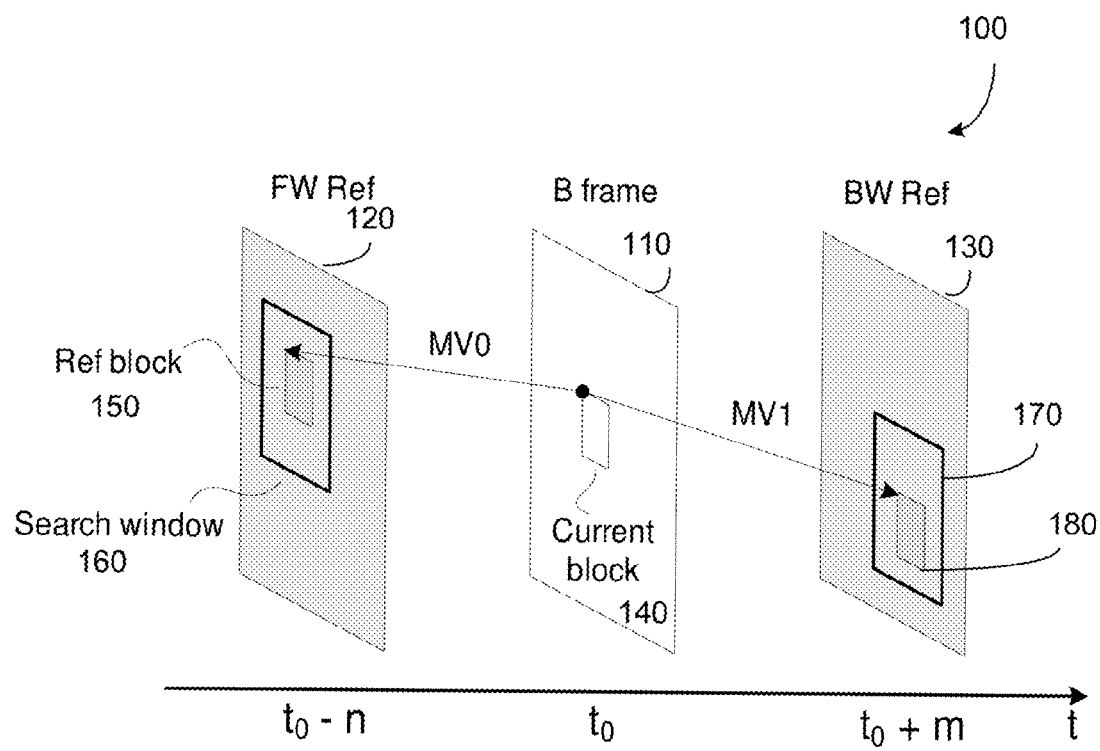
FIG. 1 illustrates motion estimation for a bi-directional video frame.
Figure 2:
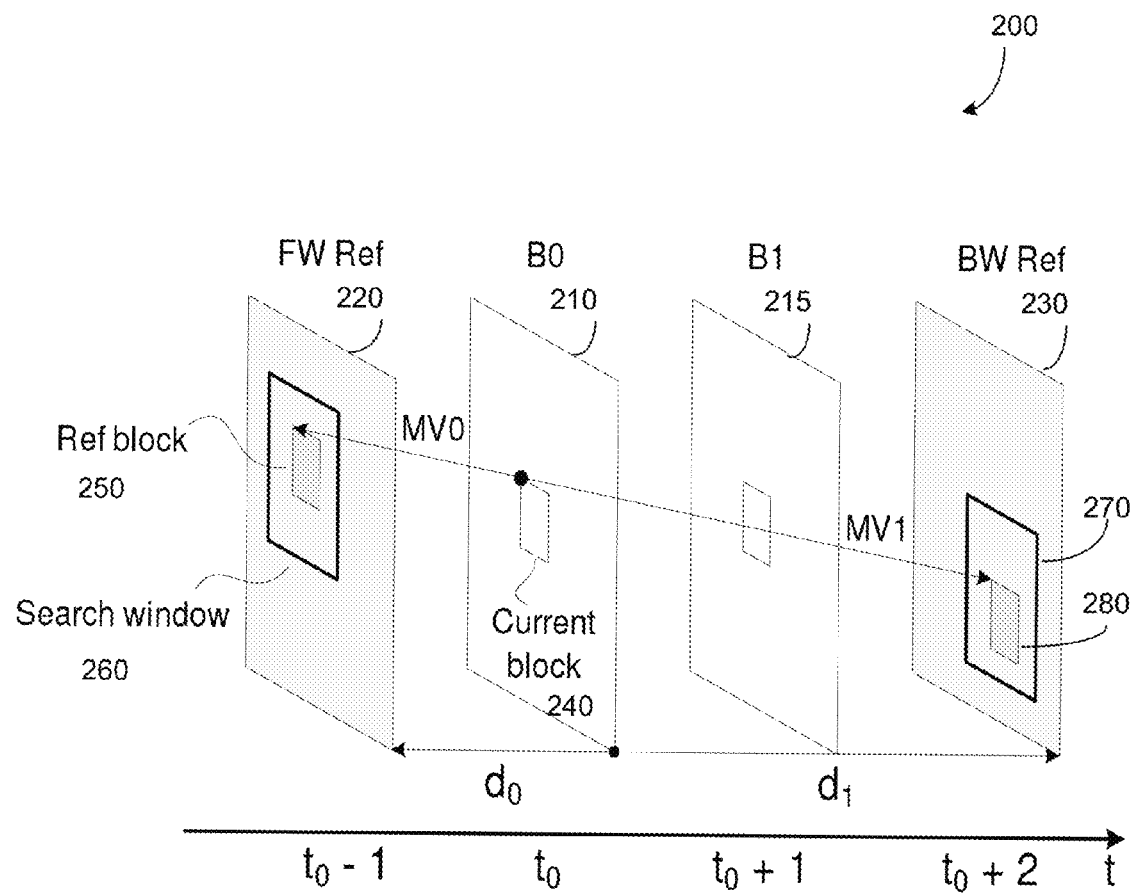
FIG. 2 illustrates mirror motion estimation at a decoder, according to an embodiment.

Mirror ME may use both forward and backward reference frames and, as a result, is generally applicable to B frame encoding. FIG. 2 shows how mirror ME may be performed according to an embodiment 200. In the embodiment of FIG. 2, there may be two B frames, 210 and 215, between a forward reference frame 220 and a backward reference frame 230. Frame 210 may be the current encoding frame. When encoding the current block 240, mirror ME can be performed to get motion vectors by performing searches in search windows 260 and 270 of reference frames 220 and 230, respectively. As mentioned above, where the current input block may not be available at the decoder, mirror ME may be performed with the two reference frames.

Figure 3:
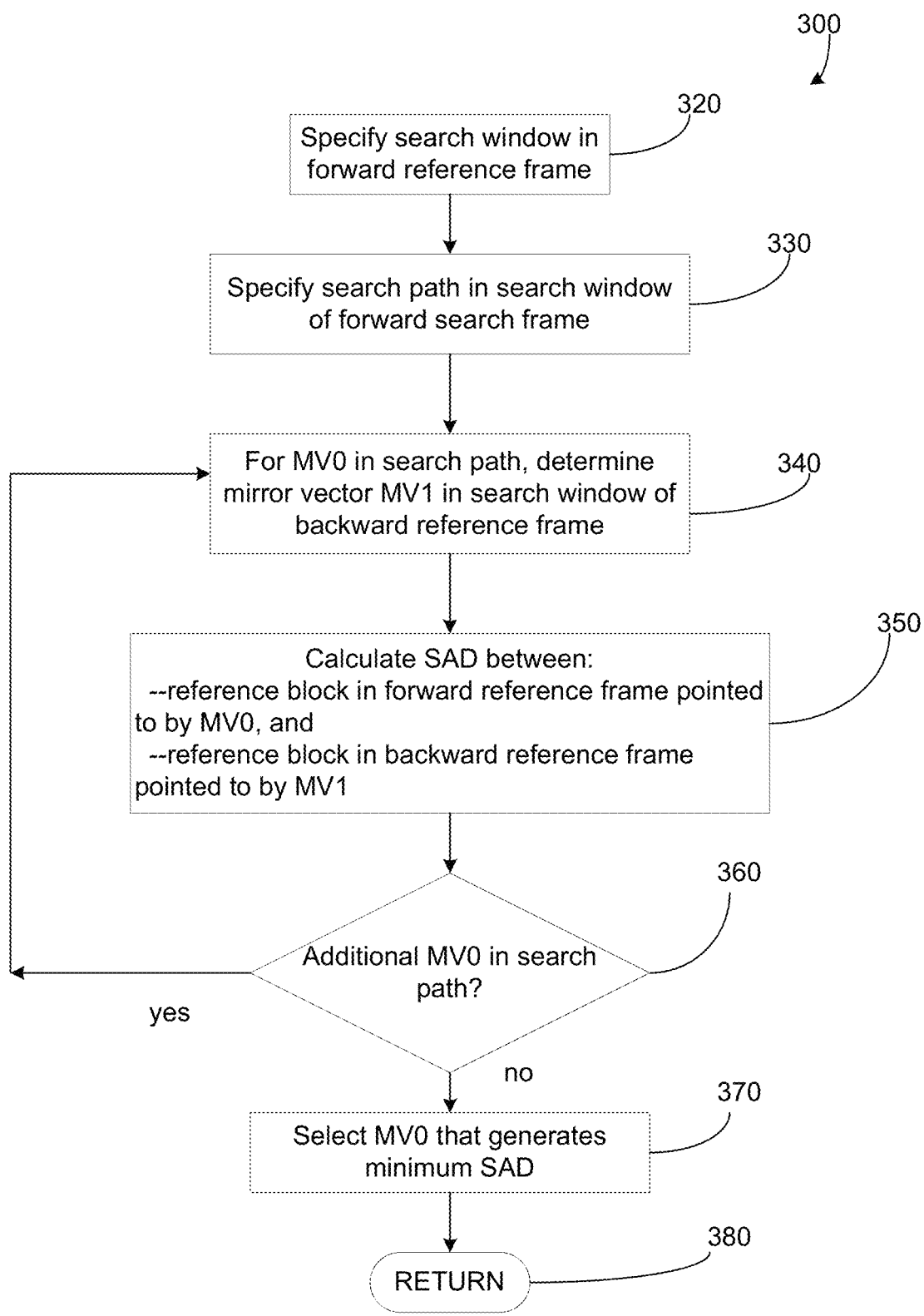
FIG. 3 is a flowchart illustrating the process of mirror motion estimation, according to an embodiment.

An exemplary motion search may proceed as illustrated in process 300 of FIG. 3. At 320, a search window may be specified in the forward reference frame. This search window may be the same at both the encoder and decoder. At 330, a search path may be specified in the forward search window. Full search or any fast search schemes can be used here, so long as the encoder and decoder follow the same search path. At 340, for an MV0 in the search path, its mirror motion vector MV1 may be obtained in the backward search window. Here it may be assumed that the motion trajectory is a straight line during the associated time period, which may be relatively short. MV1 can be obtained as the following function of MV0, where d0 and d1 may be the distances between the current frame and each of the respective reference frames.

$$MV1 = \frac{d_1}{d_0}MV0$$

At 350, a metric such as a sum of absolute differences (SAD) may be calculated between (i) the reference block pointed to by MV0 in the forward reference frame and (ii) the reference block pointed to by MV1 in the backward reference frame. These reference blocks may be shown as 250 and 280, respectively, in FIG. 2. At 360, a determination may be made as to whether any additional motion vectors MV0 exist in the search path. If so, the process may return to 340. As a result of this iteration, more than one MV0 may be obtained, where each MV0 has an associated MV1. Moreover, for each such associated pair, a metric, e.g., a SAD, may be obtained. At 370, the MV0 that generates the optimal value for the metric, e.g., the minimal SAD, is chosen. A lower value for the SAD metric, i.e., a value closer to zero, may suggest a preferred mode, because a SAD metric of zero represents a theoretical optimal value. The process concludes at 380.

Given the pair of motion vectors MV0 and MV1 that is obtained, for current block, its forward predictions P0(MV0) can be obtained with MV0, its backward predictions P1(MV1) can be obtained with MV1, and its bi-directional predictions can be obtained with both MV0 and MV1. The bi-directional predictions can be, for example, the average of P0(MV0) and P1(MV1), or the weighted average (P0(MV0)*d1+P1(MV1)*d0)/(d0+d1). An alternative function may be used to obtain a bi-directional prediction. In an embodiment, the encoder and decoder may use the same prediction method. In an embodiment, the chosen prediction method may be identified in a standards specification or signaled in the encoded bitstream.

Projective Motion Estimation at Decoder

Figure 4:
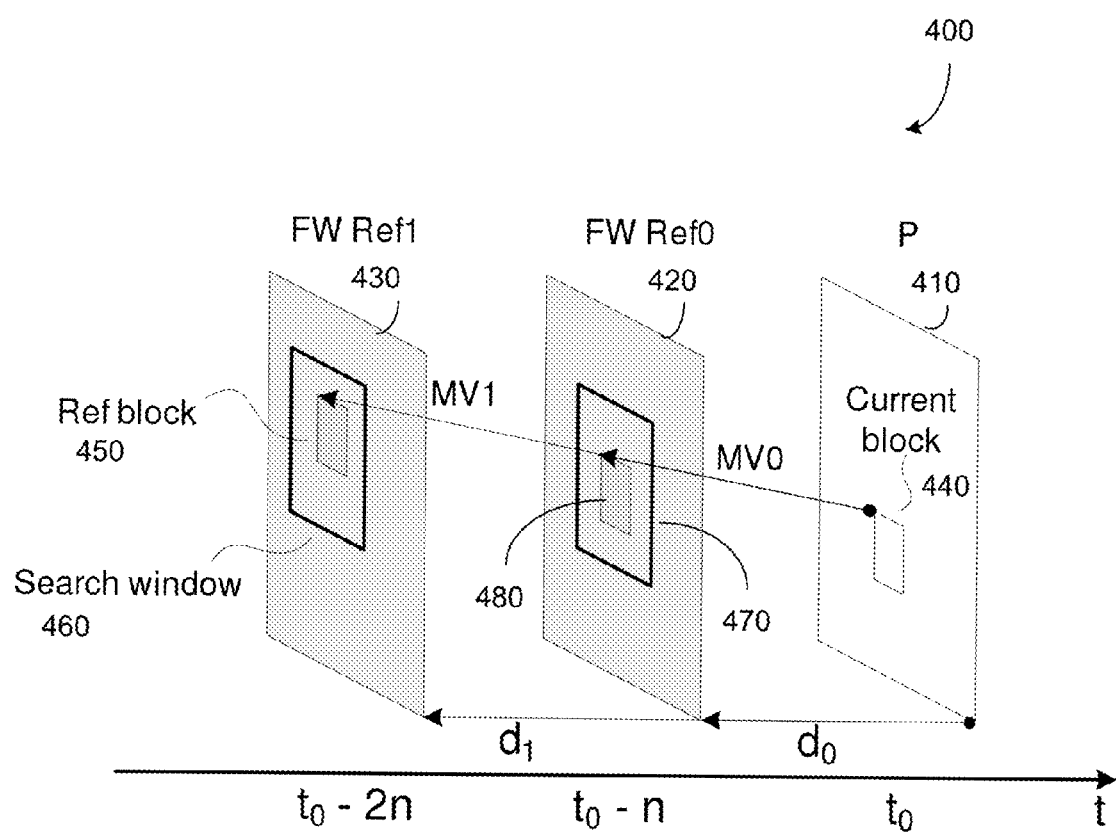
FIG. 4 illustrates projective motion estimation at a decoder, according to an embodiment.

Projective ME may be performed to derive an MV for encoding the current block. FIG. 4 shows an exemplary projective ME process 400 that may use two forward reference frames, forward Ref0 (shown as reference frame 420) and forward Ref1 (shown as reference frame 430). These reference frames may be used to derive a motion vector for a target block 440 in a current frame 410. A search window 470 may be specified in reference frame 420, and a search path may be specified in search window 470. For each motion vector MV0 in the search path, its projective motion vector MV1 may be determined in search window 460 of reference frame 430. For each pair of motion vectors, MV0 and its associated motion vector MV1, a metric, such as a sum of absolute differences, may be calculated between (1) the reference block 480 pointed to by the MV0 in reference frame 420, and (2) the reference block 450 pointed to by the MV1 in reference frame 430. The motion vector MV0 that yields the optimal value for the metric, e.g., the minimal SAD, may then be chosen as the motion vector for target block 440.

Figure 5:
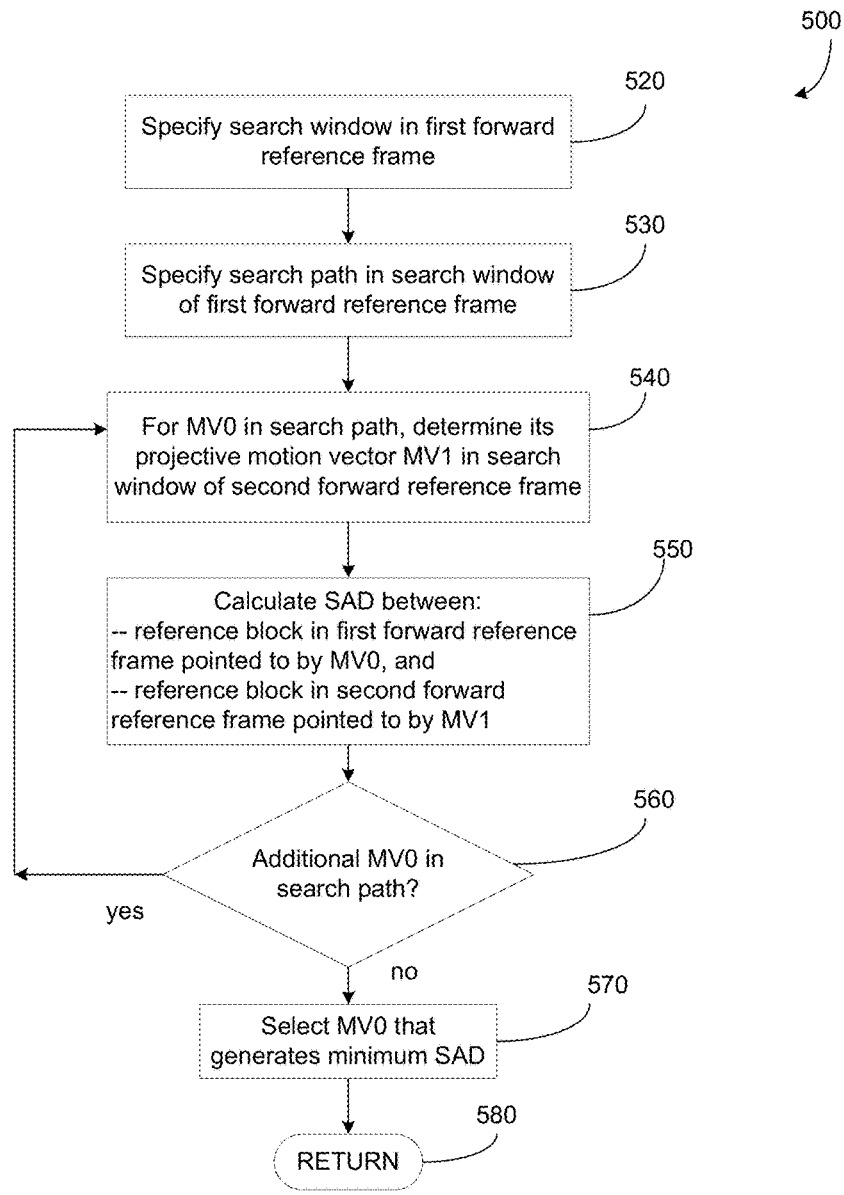
FIG. 5 is a flowchart illustrating the process of projective motion estimation at a decoder, according to an embodiment.

This process is illustrated as flow chart 500 in FIG. 5. At 520, a search window may be specified in a first forward reference frame. This window may be the same at both the encoder and decoder. At 530, a search path may be specified in this search window. Full search or fast search schemes may be used here, for example, so that the encoder and decoder may follow the same search path. At 540, for a motion vector MV0 in the search path, its projective motion vector MV1 may be obtained in the second search window. Here it may be assumed that the motion trajectory is a straight line over this short time period. MV1 may be obtained as the following function of MV0, where d0 and d1 may be the distances between the current frame and each of the respective reference frames.

$$MV1 = \frac{d_1}{d_0} MV0$$

At 550, a metric such as a SAD may be calculated between (i) the reference block pointed to by MV0 in the first reference frame, and (ii) the reference block pointed to by MV1 in the second reference frame. At 560, a determination may be made as to whether there are any additional motion vectors MV0 that remain in the search path and that have not yet been considered. If at least one MV0 remains, the process may return to 540, where for another MV0, its corresponding projective motion vector MV1 may be determined. In this manner, a set of pairs, MV0 and MV1, may be determined and a metric, e.g., a SAD, calculated for each pair. At 570, one of the MV0s may be chosen, where the chosen MV0 yields the optimal value for the metric, e.g., the minimal SAD. A lower value for the SAD metric, i.e., a value closer to zero, may suggest a preferred mode, because an SAD metric of zero represents a theoretical optimal value. This MV0 may then be used to predict motion for the current block. Process 500 concludes at 580.

The predictions for the current block may be obtained in different ways. The predictions can be P0(MV0)), P1(MV1), (P0(MV0)+P1(MV1))/2, or (P0(MV0)*d1+P1(MV1)*d0)/(d0+d1), for example. In other embodiments, other functions may be used. The predictions may be obtained in the same way at both the encoder and decoder. In an embodiment, the prediction method may be identified in a standards specification or signaled in the encoded bitstream.

Partitions Based on Multiple Block Motion Estimation

Figure 6:
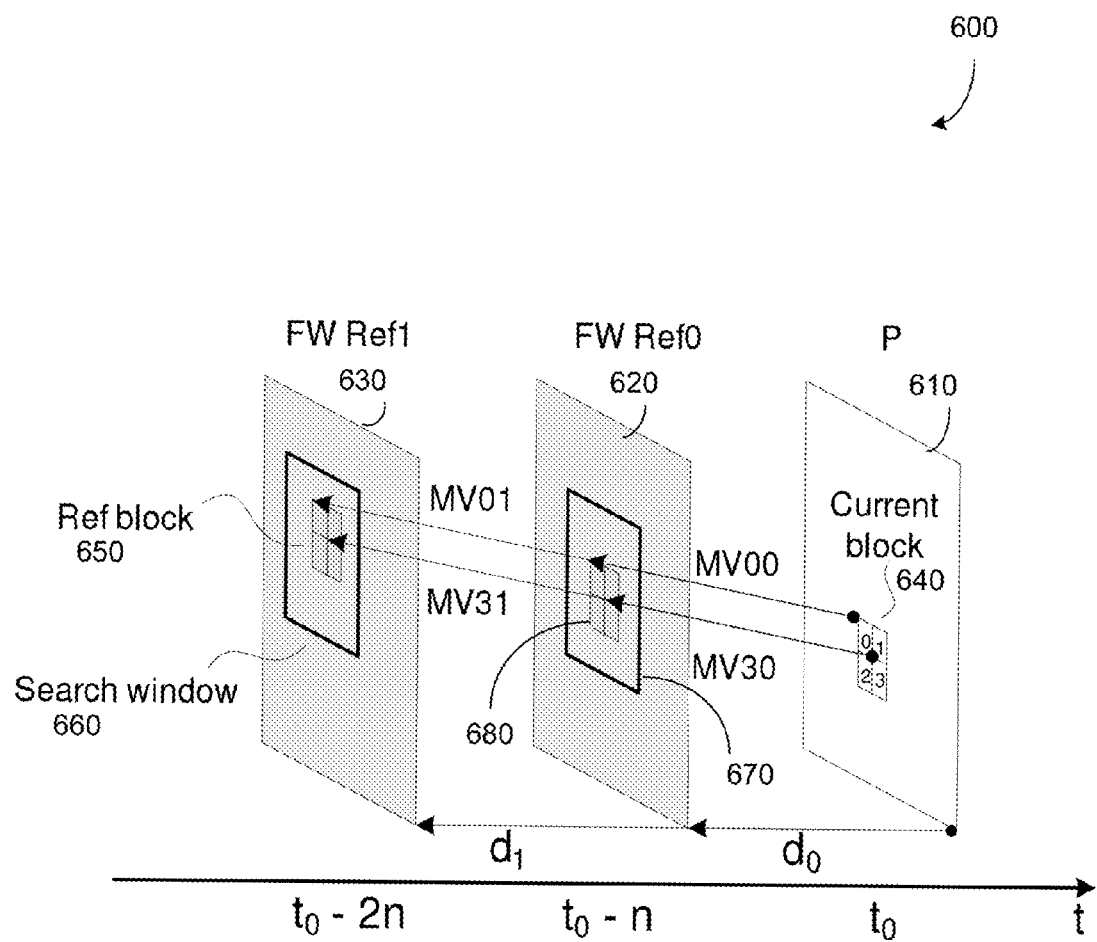
FIG. 6 illustrates projective motion estimation based on multiple block partitions, according to an embodiment.

In the above discussion of ME as performed by a decoder for a current block, the motion search block may have the same dimensions as the current block. For example, if the current block is a 16×8 block, a 16×8 block motion search may be performed to derive the MVs. The motion search may be performed on blocks that are divided differently, however. This is illustrated as embodiment 600 of FIG. 6. Assuming that in the current frame 610 the current block 640 is a 16×16 block, block 640 may be partitioned into four sub-blocks that are each 8×8, labeled as 0 . . . 3 in the figure. Then the projective ME for each 8×8 sub-block may be performed to get an MV, i.e., MVi0, for each 8×8 sub-block i to obtain an 8×8 prediction for the sub-block. This projective ME process may be analogous to the process described above with respect to FIGS. 4 and 5, but may be performed for each sub-block of a current block. Specifically, for a given sub-block, a search window 670 may be specified in a first reference frame 620, where window 670 includes a reference block 680, and a search path may be specified in this search window. For each MVi0 in the search path, its projective motion vector MVi1 may be determined in a search window 660 (which includes a reference block 650) of second reference frame 630. A metric such as a SAD may be calculated for each pair of MVi0 and MVi1, in order to find the pair having the optimal metric, e.g., the minimal SAD. This process may then be performed for each of the other sub-blocks of current block 640. In FIG. 6, two such motion vectors MVi0 are shown, labeled as MV00 and MV30. Though four MVs may be obtained in the illustrated example, it may not be necessary to transmit them to the decoder side since the decoder may derive them itself. Therefore, this block partitions-based ME process may reduce the prediction error since each 8×8 block is predicted independently. A block partitions-based mirror ME process can be performed in an analogous way.

For an input block, multiple block partitions may be available for ME. If the minimum block partition is defined as 4×4, for example, available block partitions are shown in following table. The encoder and decoder may use the same partitioning. The partitioning may be specified in a standards specification or be signaled in the encoded bitstream in an embodiment.

| Current block | Available partitions |
|---|---|
| 16 × 16 | 16 × 16, 16 × 8, 8 × 16, 8 × 8, 8 × 4, 4 × 8, 4 × 4 |
| 16 × 8 | 16 × 8, 8 × 8, 8 × 4, 4 × 8, 4 × 4 |
| 8 × 16 | 8 × 16, 8 × 8, 8 × 4, 4 × 8, 4 × 4 |
| 8 × 8 | 8 × 8, 8 × 4, 4 × 8, 4 × 4 |
| 8 × 4 | 8 × 4, 4 × 4 |
| 4 × 8 | 4 × 8, 4 × 4 |
| 4 × 4 | 4 × 4 |

Coding Modes and Mode Choice at Decoder

Figure 7:
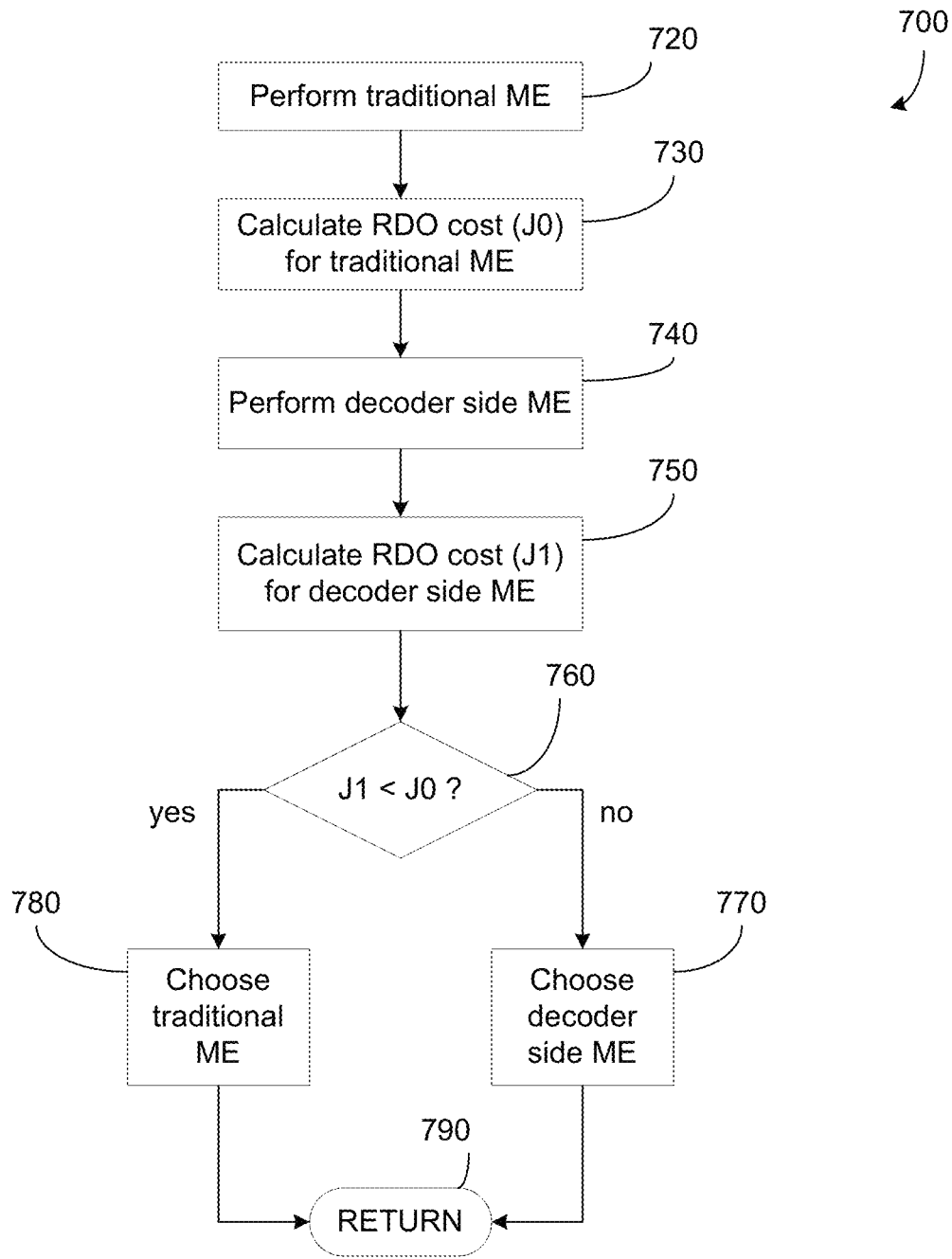
FIG. 7 is a flowchart illustrating the process of motion estimation mode choice, according to an embodiment.

In an embodiment, the traditional encoder side ME may not be replaced with the above decoder side ME. In this embodiment, any of the decoder side ME processes described above may be treated as an additional MB coding mode. Here the mode can be chosen based on a statistic such as a rate-distortion-optimization (RDO) criterion. This is illustrated in as process 700 of FIG. 7. At 720, the traditional encoder side ME may first be performed for a current block to get an MV using this coding mode. At 730, the corresponding RDO cost statistic may be calculated. Let this cost be called J0. At 740, ME may be performed at the decoder as described in any of the above embodiments, to get an MV for this coding mode. At 750, the corresponding RDO cost statistic may be calculated to be J1. At 760, the two RDO cost statistics may be compared. If J1<J0, then at 770, the decoder side ME based result may be chosen. Otherwise, the result from the traditional ME based coding mode may be chosen at 780. The process concludes at 790. In an alternative embodiment, more than two modes may be similarly evaluated, where the mode having the lowest RDO cost statistic may be chosen. A flag can be used to signal the chosen mode in the communications between the encoder and decoder. Moreover, in alternative embodiments, one or more statistical criteria other than or in addition to the RDO criterion may be used.

Implementation

The encoder and decoder described above, and the processing performed by them as described above, may be implemented in hardware, firmware, or software, or a combination thereof. In addition, any one or more features disclosed herein may be implemented in hardware, software, firmware, or combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, may refer to a computer program product including a computer readable medium having computer program logic stored therein to cause a computer system to perform one or more features and/or combinations of features disclosed herein.

Figure 8:
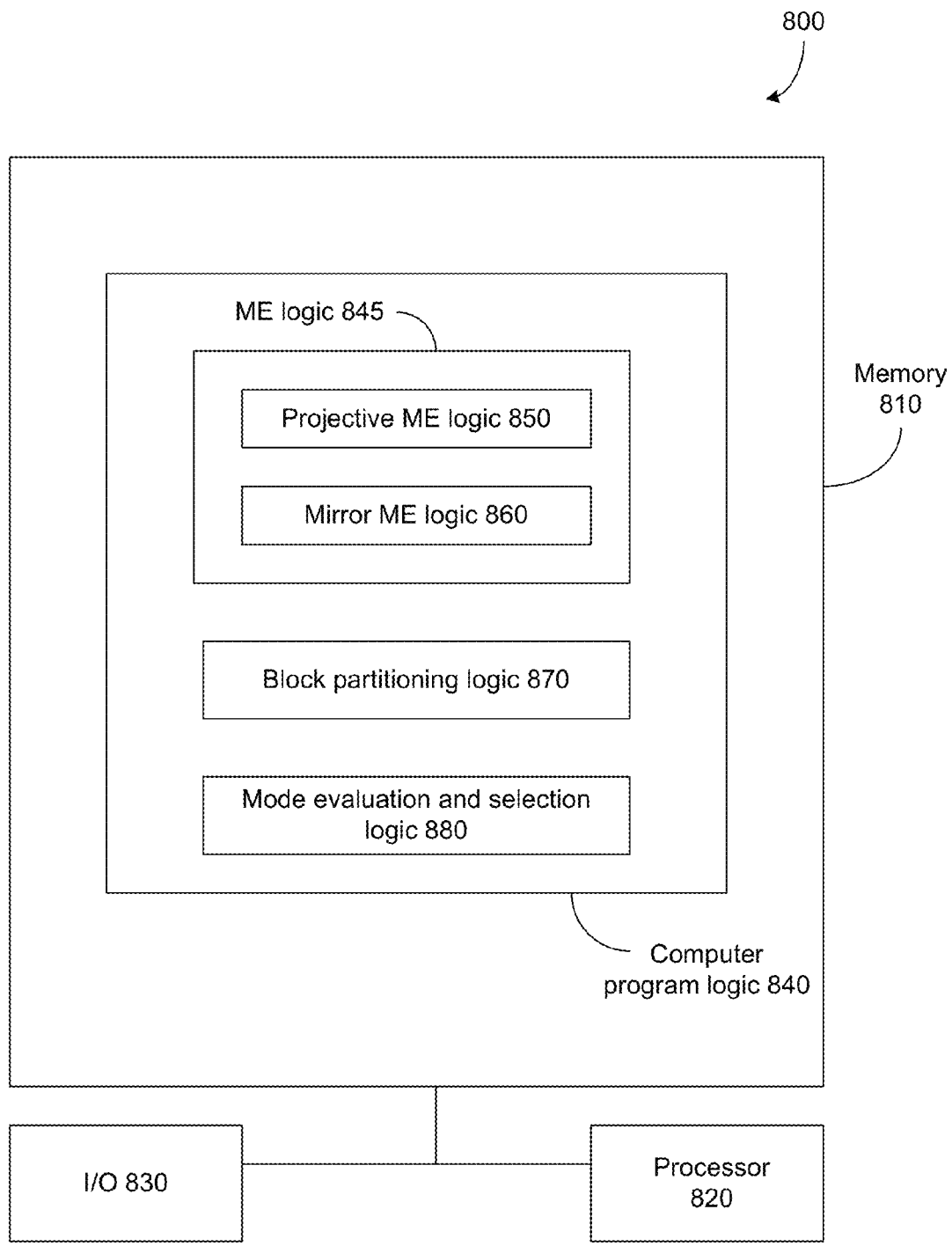
FIG. 8 is a block diagram illustrating a computing context of the systems and methods described herein, according to an embodiment.

A software or firmware embodiment of the processing described above is illustrated in FIG. 8. System 800 may include a processor 820 and a body of memory 810 that may include one or more computer readable media that may store computer program logic 840. Memory 810 may be implemented as a hard disk and drive, a removable media such as a compact disk and drive, or a read-only memory (ROM) device, for example. Processor 820 and memory 810 may be in communication using any of several technologies known to one of ordinary skill in the art, such as a bus. Logic contained in memory 810 may be read and executed by processor 820. One or more I/O ports and/or I/O devices, shown collectively as I/O 830, may also be connected to processor 820 and memory 810.

Computer program logic 840 may include motion estimation logic 845. When executed, motion estimation logic 845 may perform the motion estimation processing described above. Logic 845 may include, for example, projective motion estimation logic 850 that, when executed, may perform operations described above with respect to FIGS. 4-6. Logic 845 may also include, for example, mirror motion estimation logic 860. When logic 860 is executed on processor 820, the functionality described above with respect to FIGS. 2 and 3 may be performed.

Computer program logic 840 may also include block partitioning logic 870, which, when executed, may partition a current block into sub-blocks as shown in FIG. 6. After the partitioning, motion estimation may be performed on each sub-block by projective motion estimation logic 850, for example. Computer program logic 840 may also include mode evaluation and selection logic 880. When executed by processor 820, logic 840 may perform the processing shown as 730 and 750-780 in FIG. 7.

Alternatively, any of the logic modules shown in computer program logic 840 may be implemented in hardware.

Methods and systems are disclosed herein with the aid of functional building blocks, such as those listed above, describing the functions, features, and relationships thereof. At least some of the boundaries of these functional building blocks have been arbitrarily defined herein for the convenience of the description. Alternate boundaries may be defined so long as the specified functions and relationships thereof are appropriately performed. In addition, the encoder and decoder described above may be incorporated in respective systems that encode a video signal and decode the resulting encoded signal respectively using the processes noted above.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   specifying, at a video decoder, a search window in a first forward reference frame;
   specifying a search path in the search window of the first forward reference frame;
   for each motion vector MV0 in the search path, where each MV0 points from a current block to a reference block in the search window, determining a corresponding second motion vector MV1 that points to a reference block in a second reference frame, where the corresponding second motion vector MV1 is a function of MV0;
   calculating a metric for each pair of MV0 and MV1 that is found in the search path wherein the metric consists of a sum of absolute differences (SAD) between the reference block in the search window and the reference block in the second reference frame;
   selecting the MV0 whose corresponding value for the SAD is closest to zero, where the selected MV0 is used as a motion vector for the current block;
   determining a predicted motion for the current block, where the predicted motion is one of
      an average, and
      a weighted average,
   of predicted motion for MV0 and MV1.

2. The method of claim 1, wherein the second reference frame comprises a backward reference frame, and each MV1 is a mirror motion vector.

3. The method of claim 2, wherein the current block is located in a bi-predictive frame.

4. The method of claim 1, wherein the second reference frame comprises a second forward reference frame, and each MV1 is a projective motion vector.

5. The method of claim 4, wherein the current block is located in a predictive frame.

6. The method of claim 1, wherein for each MV0, the corresponding MV1 is determined by a function $$MV1 = \frac{d_1}{d_0} MV0$$

where $d_0$ is a temporal distance between the current block and the first forward reference frame, and $d_1$ is a temporal distance between the current block and the second reference frame.

7. The method of claim 1, wherein the current block is a sub-block of a larger partitioned block.

8. A non-transitory computer program product including a computer readable medium having computer program logic stored therein, the computer program logic including:
  motion estimation logic to
    cause a processor to determine a motion vector MV1 for each motion vector MV0 that is found in a search path in a search window of a first forward reference frame, where each MV0 points from a current block to a reference block in the search window, and where the MV1 is a function of the MV0;
    further cause the processor to calculate a metric for each pair of MV0 and MV1 wherein the metric consists of a sum of absolute differences (SAD) between the reference block in the search window and the reference block in the second reference frame; and
    further cause the processor to select the MV0 whose corresponding value for the metric is closest to zero, where the selected MV0 is used as a motion vector for the current block; and
    further cause the processor to determine a predicted motion for the current block, where the predicted motion is one of
      an average, and
      a weighted average,
    of predicted motion for MV0 and MV1.

9. The computer program product of claim 8, wherein said motion estimation logic comprises mirror motion estimation logic, and
  wherein the second reference frame comprises a backward reference frame, each MV1 is a mirror motion vector, and the current block is located in a bi-predictive frame.

10. The computer program product of claim 8, wherein said motion estimation logic comprises projective motion estimation logic, and
  wherein the second reference frame comprises a second forward reference frame, each MV1 is a projective motion vector, and the current block is located in a predictive frame.

11. The computer program product of claim 8, wherein for each MV0, the corresponding MV1 is determined by a function $$MV1 = \frac{d_1}{d_0} MV0$$

where $d_0$ is a temporal distance between the current block and the first forward reference frame, and $d_1$ is a temporal distance between the current block and the second reference frame.

12. A system, comprising:
  a processor; and
  a memory in communication with said processor, said memory for storing a plurality of processing instructions for directing said processor to
    specify, at a video decoder, a search window in a first forward reference frame;
    specify a search path in a search window of the first forward reference frame;
    for each motion vector MV0 in the search path, where each MV0 points from a current block to a reference block in the search window, determine a corresponding second motion vector MV1 that points to a reference block in a second reference frame, where the corresponding second motion vector MV1 is a function of MV0;
    calculate a metric for each pair of MV0 and MV1 that is found in the search path wherein said metric consists of a sum of absolute differences (SAD) between the reference block in the search window and the reference block in the second reference frame;
    select the MV0 whose corresponding value for the SAD is closest to zero, where the selected MV0 is used as a motion vector for the current block;
    determine a predicted motion for the current block, where the predicted motion is one of
      an average, and
      a weighted average,
    of predicted motion for MV0 and MV1.

13. The system of claim 12, wherein the second reference frame comprises a backward reference frame, each MV1 is a minor motion vector, and the current block is located in a bi-predictive frame.

14. The system of claim 12, wherein the second reference frame comprises a second forward reference frame, each MV1 is a projective motion vector, and the current block is located in a predictive frame.

* * * * *